United States Patent
Stambaugh (10) Patent No.: US 7,657,489 B2
(45) Date of Patent: Feb. 2, 2010

(54) SYSTEMS AND METHOD FOR SECURE WIRELESS PAYMENT TRANSACTIONS

(75) Inventor: Rod Stambaugh, Broomfield, CO (US)

(73) Assignee: Mocapay, Inc., Denver, CO (US)

( * ) Notice: Subject to any disclaimer, the term of this patent is extended or adjusted under 35 U.S.C. 154(b) by 220 days.

(21) Appl. No.: 11/624,620

(22) Filed: Jan. 18, 2007

(65) Prior Publication Data

US 2007/0175978 A1    Aug. 2, 2007

Related U.S. Application Data

(60) Provisional application No. 60/759,854, filed on Jan. 18, 2006.

(51) Int. Cl.
*G06F 17/60* (2006.01)

(52) U.S. Cl. .............. 705/72; 705/67; 705/64; 705/30

(58) Field of Classification Search ........... 705/72, 705/67, 64, 30
See application file for complete search history.

(56) References Cited

U.S. PATENT DOCUMENTS

| 7,043,451 | B2 * | 5/2006 | Strayer et al. .......... 705/39 |
| 2004/0230536 | A1 * | 11/2004 | Fung et al. ............ 705/64 |
| 2005/0177517 | A1 | 8/2005 | Leung |
| 2006/0016880 | A1 | 1/2006 | Singer |
| 2007/0175978 | A1 * | 8/2007 | Stambaugh ............ 235/379 |
| 2007/0198354 | A1 * | 8/2007 | Senghore et al. ........ 705/14 |
| 2008/0052189 | A1 * | 2/2008 | Walker et al. .......... 705/26 |
| 2009/0063312 | A1 * | 3/2009 | Hurst ................. 705/30 |
| 2009/0164326 | A1 * | 6/2009 | Bishop et al. .......... 705/19 |
| 2009/0164331 | A1 * | 6/2009 | Bishop et al. .......... 705/19 |
| 2009/0265241 | A1 * | 10/2009 | Bishop et al. ......... 705/14.38 |

FOREIGN PATENT DOCUMENTS

| JP | 2004164597 A | * | 6/2004 |
| WO | PCT/US08/51395 | | 1/2008 |

* cited by examiner

*Primary Examiner*—Pierre E Elisca
(74) *Attorney, Agent, or Firm*—Cooley Godward Kronish LLP (57) ABSTRACT

When purchasing an item or service, a user enters a PIN enter their mobile communication device and send the PIN, e.g., via text message to a payment authority. The payment authority authenticates the user using at least the PIN and the mobile communication device identifier associated with the user's mobile communication device. If the user is authenticated, then the payment authority will send a transaction code back to the user, which will be displayed on the user's mobile communication device. The user can then provide the transaction code to the merchant. The merchant can enter the transaction code into the Merchant's point of sale system and complete the transaction.

28 Claims, 7 Drawing Sheets

SYSTEMS AND METHOD FOR SECURE WIRELESS PAYMENT TRANSACTIONS

RELATED APPLICATIONS INFORMATION

This application claims priority under 35 U.S.C. 119(e) to U.S. Provisional Application Ser. No. 60/759,854 filed on Jan. 18, 2006

BACKGROUND

1. Field of the Invention

The embodiments described herein relate to using a wireless device, such as a cell phone, to pay for a transaction, and more particularly providing secure authentication for such payment transactions.

2. Background of the Invention

As contactless payment systems have become more common, there has been a recent push to enable contactless payment of transactions via a consumer's cell phone. As with contactless payment cards, cell phones are being equipped with a short range Radio Frequency Identification (RFID) chip. A wallet application is then downloaded to the cell phone and a dollar amount is stored in the wallet. To pay for a transaction, the consumer then simply waives their cell phone within a few inches of a special display found in stores that accommodate such a payment mechanism. The special display includes an RFID reader that can access the wallet and deduct the appropriate amount via the RFID chip on the cell phone.

In one such system, the wallet can be charged up, i.e., the dollar amount can be stored in the wallet on the cell phone, by interfacing the cell phone with a special machine. Once the device is interfaced with the machine, the consumer can insert bills into the machine and the wallet on the cell phone will be charged up with the corresponding dollar amount. In other systems, once the wallet application is downloaded to the user's cell phone the user can enroll other associated services such as debit and/or credit cards for transaction payment. These contactless payment cell phones have taken the place of older systems that allow the user to pay for a transaction by punching buttons on the cell phone. Often, the charge for such transactions would then show up on the user's cell phone bill.

Such systems have several draw backs. For example, rolling out machines that interface with a cell phone and accept dollars add significant infrastructure cost for the cell phone carrier or financial institution in charge of the system. Further, seeking out such machines can be time consuming and/or inconvenient, and may limit adoption. Further, downloading applications and enrolling services may also limit adoption if the consumer feels that it is too complicated or too time consuming. Another major draw back to such systems, is the lack of secure authentication involved.

It will be understood that multifactor authentication is preferred for financial transactions. For example, the simplest form of multifactor authentication is two factor authentication in which the transaction is authenticated based on something the consumer has and something the consumer knows. The ubiquitous ATM or debit card is the best example of this. In order for an ATM or debit transaction to be successful, the user must possess their card (something the user has) and know their PIN (something the user knows). Even two factor authentication can virtually eliminate fraudulent transactions.

The systems above, however, are only single factor authentication systems. In other words, the consumer simply needs to have their phone and waive it in front of the special display in order to complete a transaction. Accordingly, there is a risk that the consumer's cell phone can be stolen and then be used to make transactions.

One system tries to avoid this problem of authentication by requiring their user to input a code associated with the item to be purchased and then transmit the code to a pre-defined number, e.g., via a text message. The pre-determined number is associated with a payment system and when the message including the code is received, it will trigger an operator to call the user's cell phone in order to confirm the order. The consumer can then be required to provide a secret PIN to the operator in order to complete the transaction. While such a system may provide better authentication, it eliminates the convenience of fast, contactless payment.

SUMMARY

A secured transaction payment system allows a user to use their mobile communication device to complete payment transactions. The user first sets up a prepaid account and selects a Personal Identification Number (PIN). An identifier that identifies the user's mobile communication device is then associated with the PIN. When the user wishes to complete a payment transaction using their mobile communication device, the user inputs the PIN into the device and sends it, e.g., via a text message, to a pre-determined number, such as a 5 digit short code.

The pre-determined number is associated with the payment authority on which the user's account is stored. When the payment authority receives the PIN, the message will also include the user's device identifier. The payment authority can then check the PIN and device identifier in order to authenticate the user. If the user is authenticated, then the payment authority will transmit a transaction code back to the user. The user will receive the transaction code on their mobile communication device and can provide the transaction code to the merchant.

The merchant can then enter the transaction code into their Point Of Sale (POS) system. The POS system can then transmit the transaction code, a merchant ID, and the transaction dollar amount to the payment authority. When the payment authority recognizes the transaction code, it will check the user's account to make sure that sufficient funds are available to cover the dollar amount, and if so will transmit an approval code back to the POS system. When the POS system receives the approval code, the transaction can be completed and a receipt will be generated for the user.

Accordingly, the system provides multifactor authentication by requiring the PIN (something the user knows) and the device identifier (something the user has).

For example, when the user transmits their PIN, the message is first routed through a message authority. Accordingly, when the message is finally received by the payment authority it can also include an identifier that identifies the message authority. This identifier can also be used in the authentication process to ensure that the message is actually being received from the correct message authority.

In another aspect, the message authority can be required to provide a digital certificate to provide a further factor for authentication.

In still anther aspect, the transaction code sent back to the user can include blanks, or X's that are to be filled in with numbers or data known to the user. In other words, if the transaction is, e.g., a four-digit number, then the payment authority can transmit two of the numbers and leave two of the numbers blank. The user can then complete the four-digit code using two numbers known to the user. In addition to knowing the user's PIN, the payment authority will also know the two numbers known to the user. Accordingly, when the transaction code is then transmitted back to the payment authority via the POS system, the payment authority will be able to verify the code as a correct code.

In still another embodiment, the length of the transaction code can be variable based on a certain time, date, etc., in order to avoid the possibility that the same code would be sent to more than one consumer at the same time. For example, if transaction volume increases significantly at lunch time, then, e.g., a four-digit code may not provide enough distinct codes for every simultaneous transaction. In such instances, the length of the code can be extended, e.g., to five digits in order to avoid this situation.

In still another embodiment, the transaction code can be valid for a set period of time, e.g., 15 minutes, in order to prevent a fraudulent transaction if the user's mobile communication device is left unattended before completing the transaction.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

In the systems and methods described below, secure wireless payment transactions can be completed by requiring a user to send a message to a pre-determined number and input a PIN associated with the user's account. The PIN is transmitted, e.g., via a text message, to a payment authority, which can authenticate the user based on the PIN the user provided in an identifier identifying the user's mobile communication device. For example, when a mobile communication device initiates a communication, whether the communication is a text message, voice call, mobile e-mail, etc., the message usually includes the mobile communication device number, e.g., the telephone number associated with the mobile communication device. Accordingly, the payment authority can use the PIN provided by the user and the mobile communication device identifier included in the message to authenticate the user. This provides two factor authentication since the user must have their mobile communication device and know their PIN.

The term mobile communication device is intended to include a cell phone, smart phone, Personal Data Assistant (PDA) with wireless communication capabilities, a portable digital music player with wireless communication capabilities, or any portable device that includes wireless communication capabilities. At the core of a system configured to implement the functions described herein is a payment authority. The term "authority" as used herein is intended to refer to all the resources, i.e., hardware and software, needed to perform the associated functions described herein. Thus, for example, the term "authority" is intended to encompass all of the processors, servers, routers, databases, user interfaces, APIs, communications interfaces, and applications needed to perform the functions described below.

A payment authority can be configured to set up and maintain user accounts for use in secure wireless payment transactions. A payment authority is also responsible for authenticating and approving user transactions. FIGS. 1 through 6 illustrate flowcharts that describe example methods for setting up a user account and using the user account for secure wireless payment transactions. FIG. 7 is a diagram illustrating an example of a secure wireless payment transaction system in accordance with one embodiment.

Figure 1:
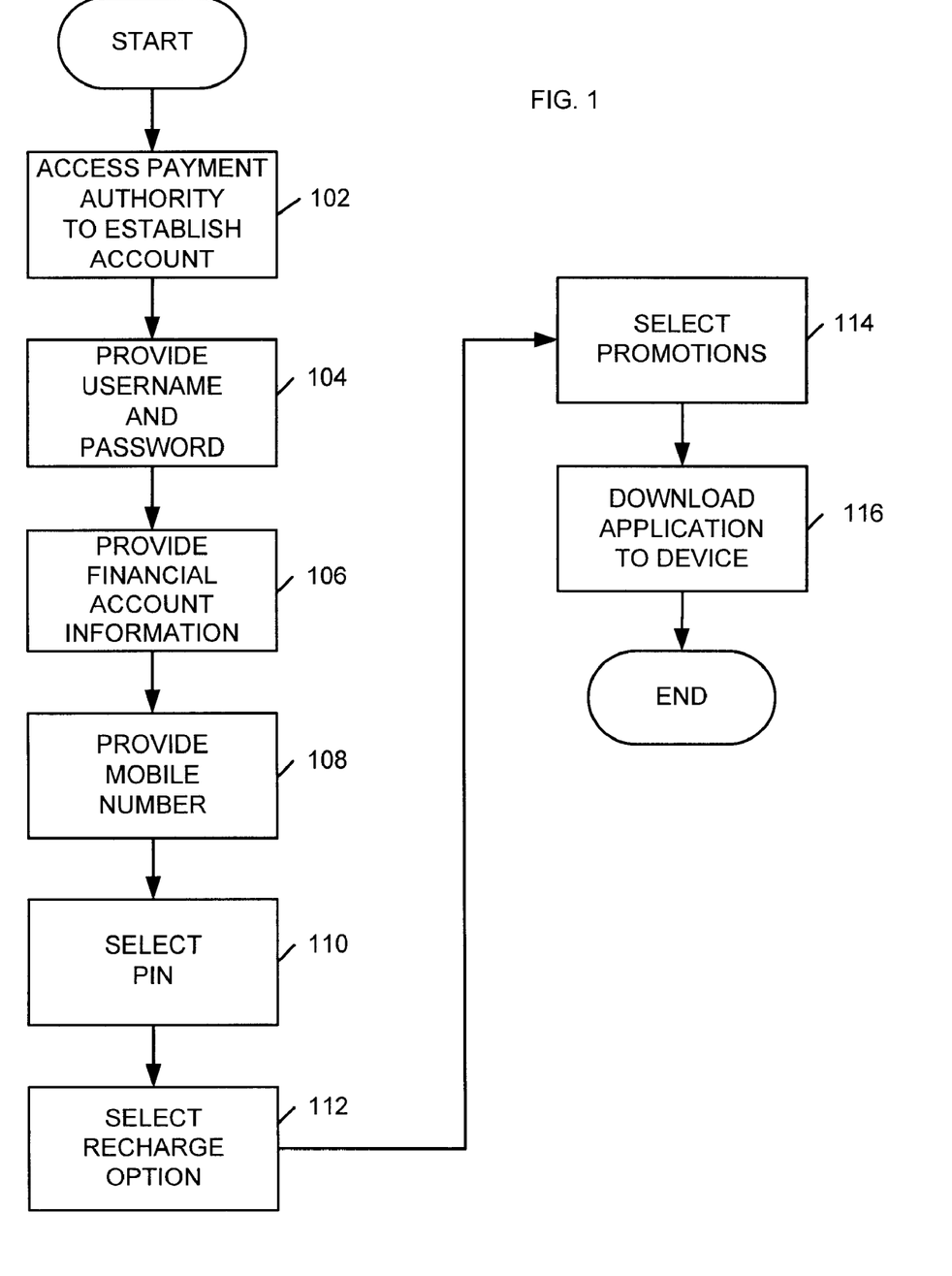
FIG. 1 is a flowchart illustrating an example method of a user establishing a payment account on a payment authority in accordance with one embodiment.

FIG. 1 is a flowchart illustrating an example process for establishing an account on a payment authority in accordance with one embodiment described herein. First, in step 102, a user can access the payment authority to establish an account. For example, in certain embodiments, the user can access the payment authority via a homepage on the worldwide web. Depending on the embodiment, the user can access the homepage using their computer and/or their mobile communication device.

In step 104, the user can supply a user name and password. For example, the user can be asked to generate a unique username and password in step 104. In certain other embodiments, however, the user's user name can be the user's mobile communication device identifier, e.g., the user's mobile communication device 10 digit telephone number. Further, the user can be asked to generate a unique password, or the password can be generated by the system. For example, in one embodiment, the user's password is sent to the user's mobile communication device. Thus, the password entered in step 104 is the password the user received on the user's device. This can help verify the user's mobile communication device identifier.

In step 106, the user can then provide their financial account information. This financial account information will be used to charge the user's account as described below.

In step 108, the user can then provide their mobile communication device identifier, i.e., telephone number, if not already provided, e.g., in step 104.

The PIN will often comprise a series of digits, such as numbers or alphanumeric digits. Since today's mobile communication devices can include sophisticated keyboards and text entry methods, the PIN selected in step 110 can comprised a variety of symbols, characters, data, etc; however, to ensure that the PINs operate over the broadest range of mobile communication devices, the digits comprising the PIN established in step 110 should be limited to data that can be input via a simple telephone keypad. Accordingly, the digits comprising the PIN established in step 110 should be limited to the numbers 0-9 and/or letters A-Z, which are often associated with numbers on a simple cellular phone keypad as will be understood.

In step 112, the user can select a recharge option indicating to what level the account should be charged using the financial account information provided in step 106. For example, the user can select to charge their account to $100 and to automatically recharge the account to $100 whenever the account balance drops below $20. Alternatively, the user can opt for manual recharging, which would require the user to log-on and recharge the account as needed. In other embodiments, the user can select to charge their account based on a predetermined frequency, e.g., every week, 2 weeks or every month. It should be noted, however, that the frequency recharging option should also include a start date and a stop date. Simple and obvious variations, combinations, are alternatives to these recharging options will be apparent and can all be used with the systems and methods described herein.

In certain embodiments, the user can enter, or select promotions in step 114. For example, the user may have received an incentive or promotion to establish an account. Such an incentive or promotion could be an initial, e.g., $10 charge up of the account, or a discount at a participating merchant. The incentive or promotion can be associated with a promotion code which the user can input in step 114 in order to obtain the incentive or promotion. Alternatively, in certain embodiments, the user can select from a list of promotions during account establishment. Selection of the promotion in step 114 can comprise an opt-in selection. In other words, the user can opt-in to receive via their mobile communication device promotion such as discounts or coupons to participating merchants.

In certain embodiments, the promotions can be location-based promotions or services. For example, as explained below, when the user is engaged in a transaction, the merchant provides a merchant identifier to the payment authority. The payment authority can use this merchant identifier to determine the location of the user. Promotions for merchants in the area, such as discounts, coupons, sales, etc. can then be sent to the user via the user's mobile communication device. Moreover, the promotions can be selected based on the type of transaction being engaged in by the user. For example, if the user is buying clothes, then promotions for other clothes merchants within the area can be forwarded to the user. In this manner, the systems and methods described herein can provide simple, targeted location based services for the user.

In most embodiments, account establishment ends after step 112, or possibly step 114. In certain embodiments, however, an application, such as a digital wallet, can be downloaded to the user's mobile communication device in step 116. In such instances, the user can interface their mobile communication device with their computer in order to download the application. Alternatively, the application can be downloaded over the air to the user's mobile communication device.

Figure 2:
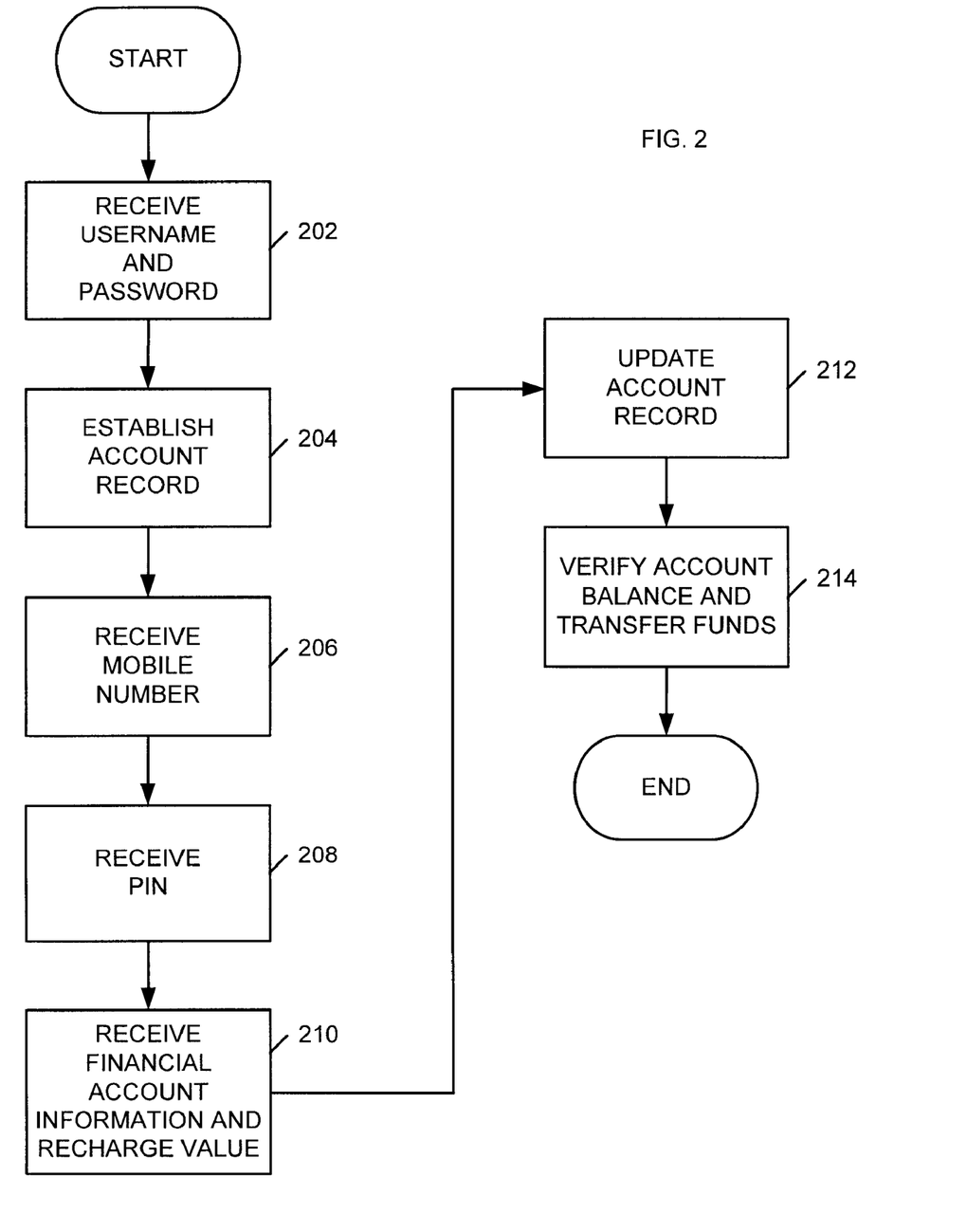
FIG. 2 is a flowchart illustrating an example method of a payment authority receiving user information and establishing a payment account for the user in accordance with one embodiment.

Referring to FIG. 2, an example process for account establishment is illustrated from the perspective of the payment authority. Thus, in step 202, the payment authority will receive the user name and password (as provided in step 104) and will establish an account record in step 204. In step 206, the payment authority will receive the user's mobile communication device identifier (step 108), if it has not already been received, e.g., in step 202. In step 208, the payment authority will receive the user's PIN as selected in step 110.

It should be noted that PIN creation can be a more involved process. For example, step 208 will often comprise the payment authority activating a PIN generation application designed to aid the user in establishing a unique PIN. The goal of such an application can also be to generate a PIN that cannot be easily guessed and that meets other requirements such as length.

In step 210, the payment authority can receive the user's financial account information and recharge value. In certain embodiments, the payment authority can be configured to query financial institutions associated with the financial account information to determine whether or not the user has sufficient funds to establish and charge an account. In step 212, the payment authority can be configured to update the account record with the information received in steps 202 to 210, and then if it is not already done so verify the account balance and transfer funds in step 214 using the financial account information and recharge value received in step 210.

Figure 3:
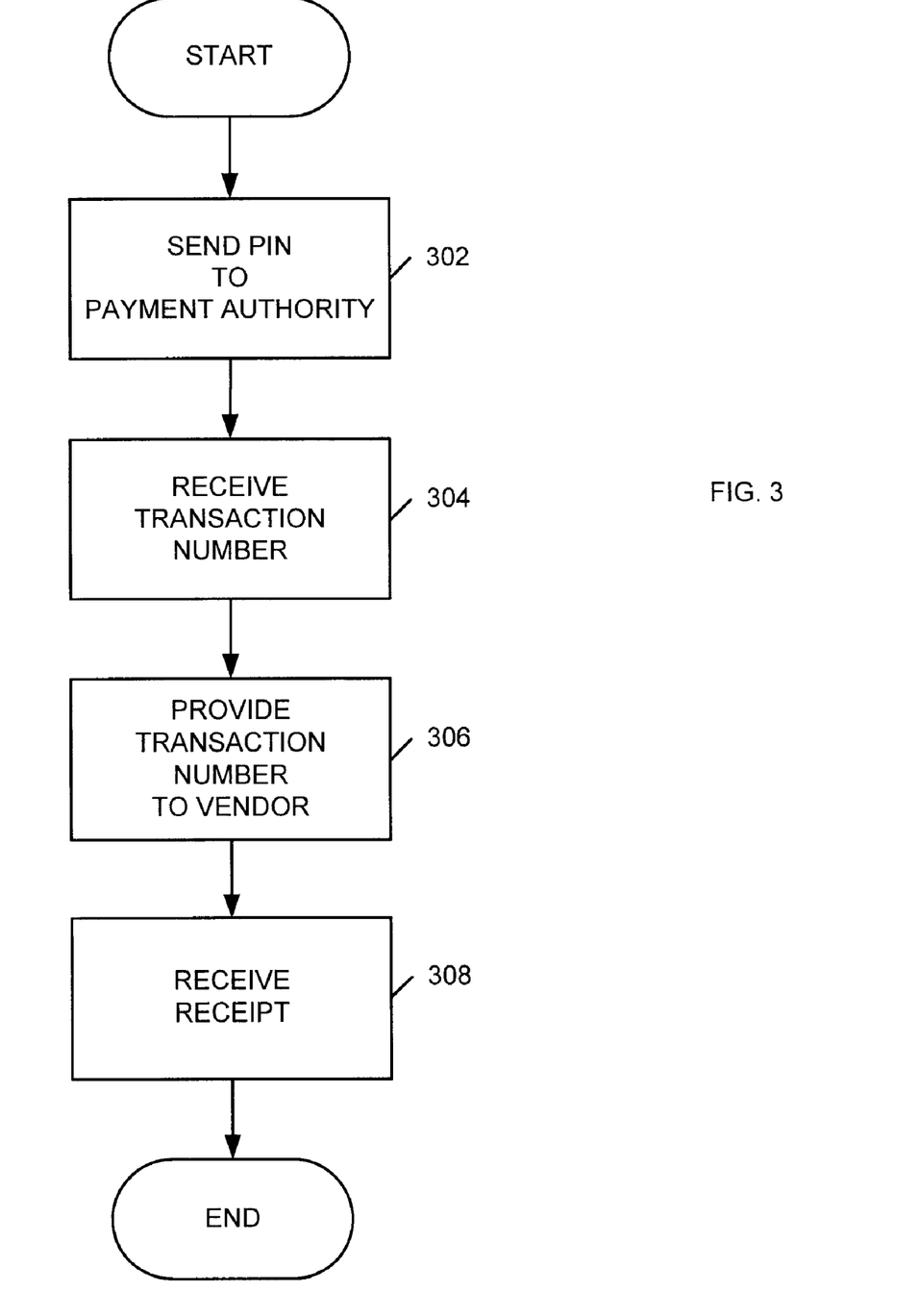
FIG. 3 is a flowchart illustrating an example method of a user using that mobile communication device to complete a payment transaction in accordance with one embodiment.

Now that the user's account has been established, the user is set to use their mobile communication device for secure wireless payment transactions. FIG. 3 is a flowchart illustrating an example process by which the user can use their mobile communication device in order to engage in such transactions. When the user has selected an item at a participating merchant and is ready to pay, the user can send their PIN, established in step 110, to the payment authority in step 302. Often this will comprise the user inputting their PIN via the mobile communication devices user interface, e.g., keypad.

In certain embodiments, the PIN can be sent via text message. For example, an SMS short code can be associated with the payment authority. The user can then input their PIN and send them a text message via the Short Message Service (SMS) system. As explained above, the text message will include the mobile communication device identifier, i.e., the Mobile Identification Number (MIN). The payment authority can use the PIN and the mobile communication device identifier to authenticate the user. If the user is authenticated, then the user will receive a transaction number via their mobile communication device. For example, the payment authority can send, in step 304, a text message back to the user that includes the transaction number. When the user's mobile communication device receives the message, it can display the transaction number on the mobile communication device display.

The user can then provide the transaction number to the merchant in step 306 and the merchant can use the transaction number to complete the transaction and provide a receipt to the user in step 308.

In certain embodiments, a real time account balance in also provided in step 304 so the user knows their account balance before making a purchase transaction.

Figure 4:
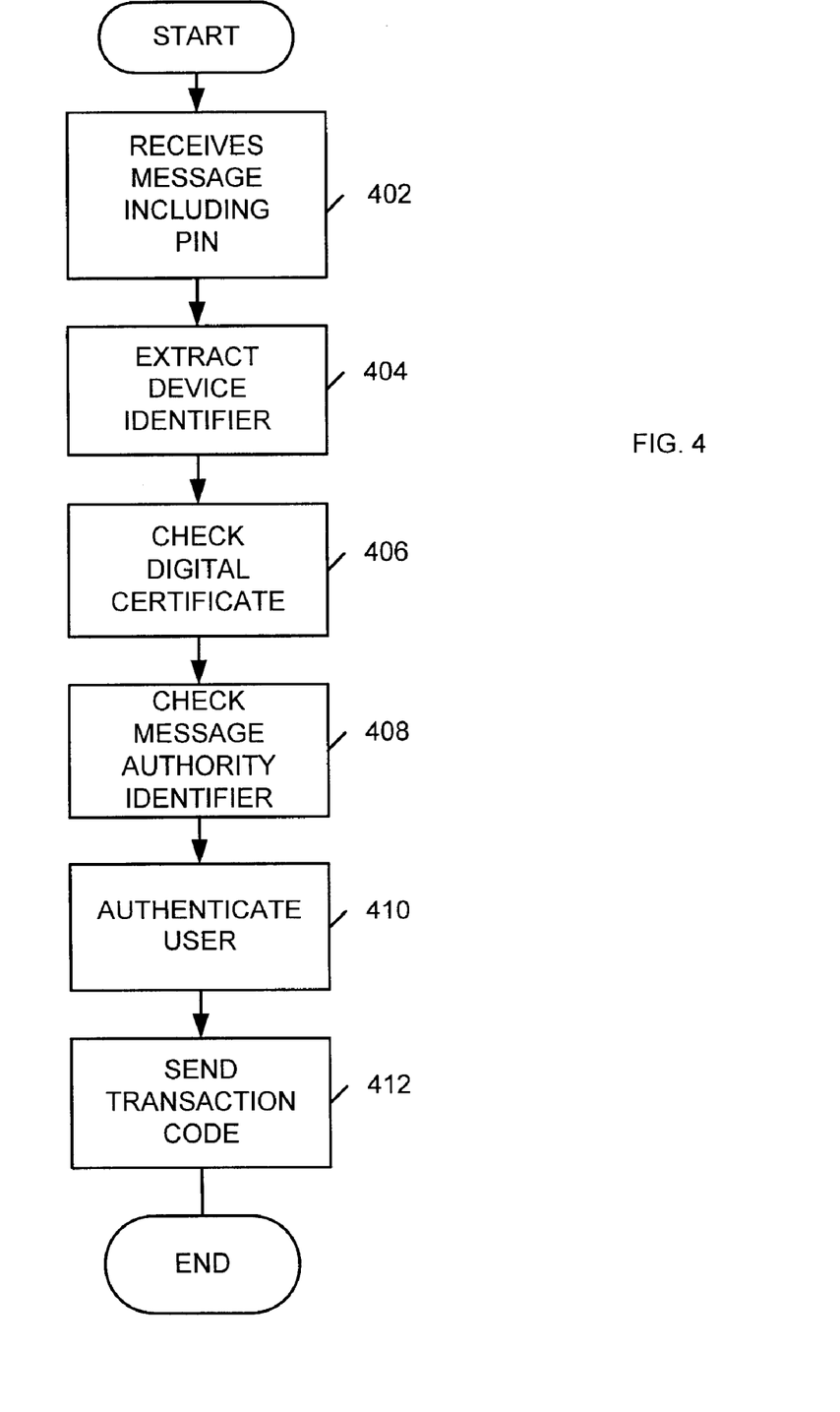
FIG. 4 is a flowchart illustrating an example method for authenticating a payment transaction in accordance with one embodiment.

FIG. 4 is a diagram illustrating a process for completing a payment transaction from the perspective of the payment authority. First, in step 402, the message authority can receive a message that includes the PIN. As explained above, this message can comprise a text message sent via the SMS system; however, in other embodiments, the message can be sent via the Mobile Message Service (MMS) system, via mobile e-mail, or even via voice message, e.g., using voice recognition technology. Once the message is received the payment authority can extract the mobile communication device identifier in step 404. In certain embodiments, the PIN and the device identifier can be used to authenticate the user in step 410. In other embodiments, further information can be used to provide even stronger multifactor authentication. For example, in certain embodiments, a digital certificate can be used as an additional factor in the authentication process. When the message is sent by the user in step 302, the message is typically relayed to the payment authority through a message authority. For example, an SMS message is sent through a $3^{rd}$ party message authority. Thus, the message authority can be figured to attach a digital certificate in step 406 that can be used as an additional factor for user authentication.

Additionally, or in the alternative, certain embodiments can use a message authority identifier as a further factor for authentication of the user. In other words, since the message authority and payment authority are interfaced over a network, the message authority's network identifier, such as the message authority's IP Address or other unique identifier, can be used to ensure that the message is coming from the appropriate message authority in step 408.

As noted, the information received in steps 402 through steps 408 can be used to authenticate the user in step 410. Once authenticated, the payment authority can be configured to send a transaction code to the user in step 412.

The transaction code can comprise any data or information that can be displayed on a users, mobile communication device and that can be input into the POS systems of participating merchants. In certain embodiments, for example, the transaction code is a 4, 8, etc., digit code comprising purely numbers or alphanumeric data. As explained below, the length of the code can be variable in certain embodiments.

In one specific implementation, the code is a 4 digit numerical code. Accordingly, once the user is authenticated, the payment authority can be configured to transmit a 4 digit numerical code back to the user's mobile communication device. The device can then display the code to the user so that the user can provide the code to the merchant.

Figure 5:
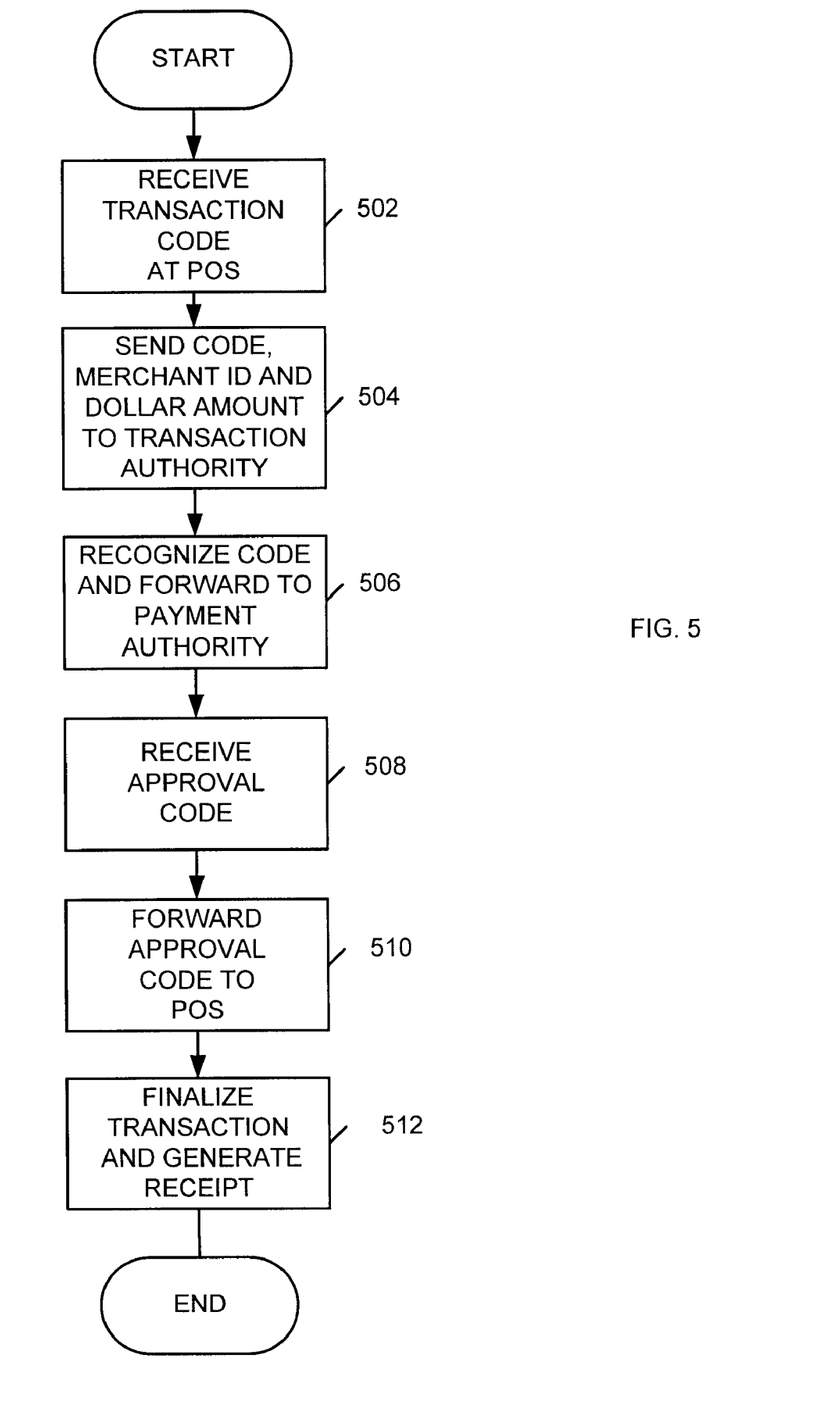
FIG. 5 is a diagram illustrating an example method for completing a payment transaction on a point of sale which can be abbreviated POS system.

FIG. 5 is a flow chart illustrating an example method for completing a transaction using the code provide in step 412 from the point of view of the merchant POS system. First, in step 502, the merchant will receive the transaction code from the user and input it into the POS system. In step 504, the POS system can be configured to send the code to a transaction authority. The transaction authority can, for example, be a gift card or stored value card transaction processor. Thus, the transaction code can be processed just as any other gift card or stored value card transaction would be processed.

Along with the transaction code, the POS can be configured to forward a merchant ID, and the transaction dollar amount in step 504.

In step 506, the transaction authority can be configured to recognize the transaction code as being associated with the payment authority and forward the transaction information to the payment authority. The payment authority in turn should recognize the transaction code and return an approval code in step 508. The transaction authority can in turn forward the approval code to the originating POS in step 510, which can complete the transaction and generate a receipt in step 512.

Figure 6:
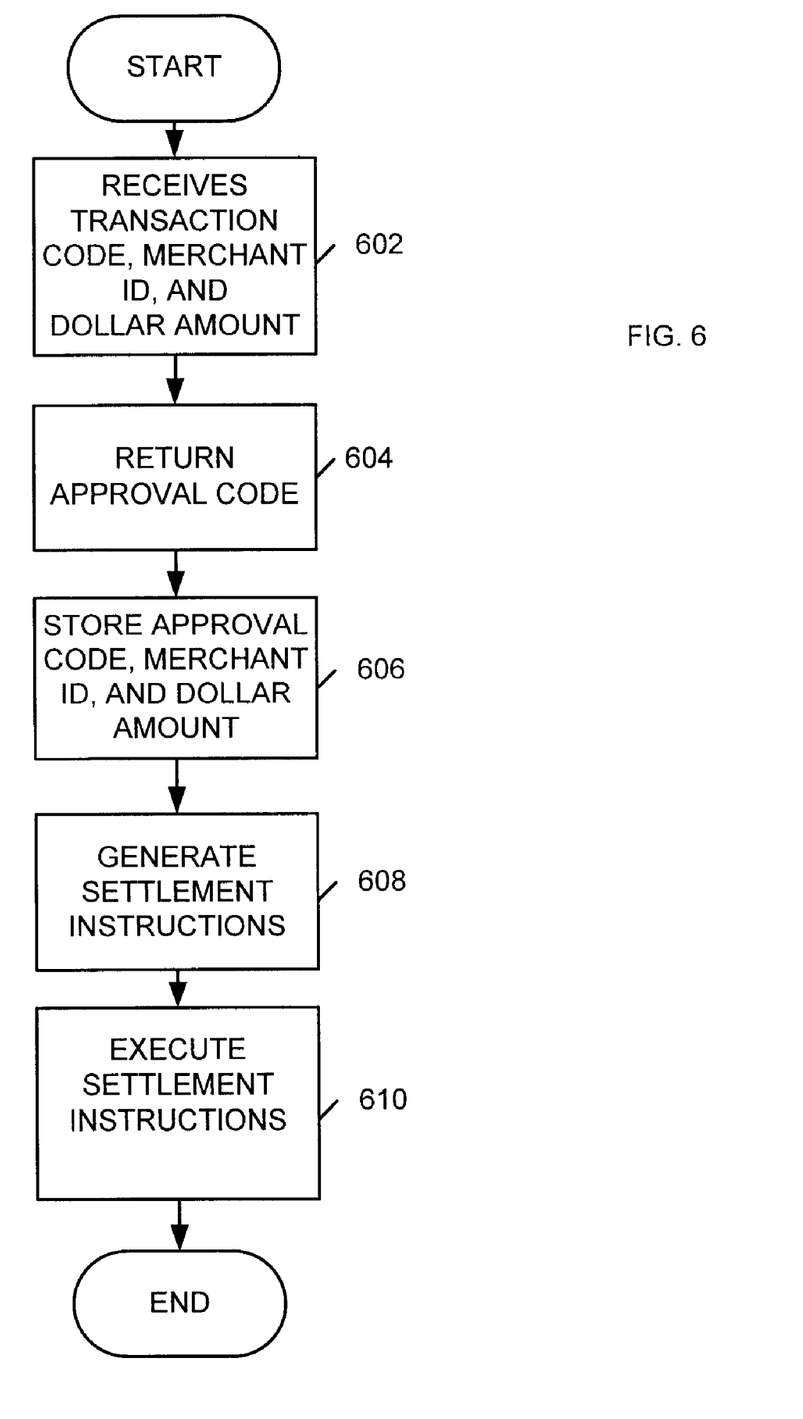
FIG. 6 is a diagram illustrating an example method for proving a payment transaction in accordance with one embodiment.
Figure 7:
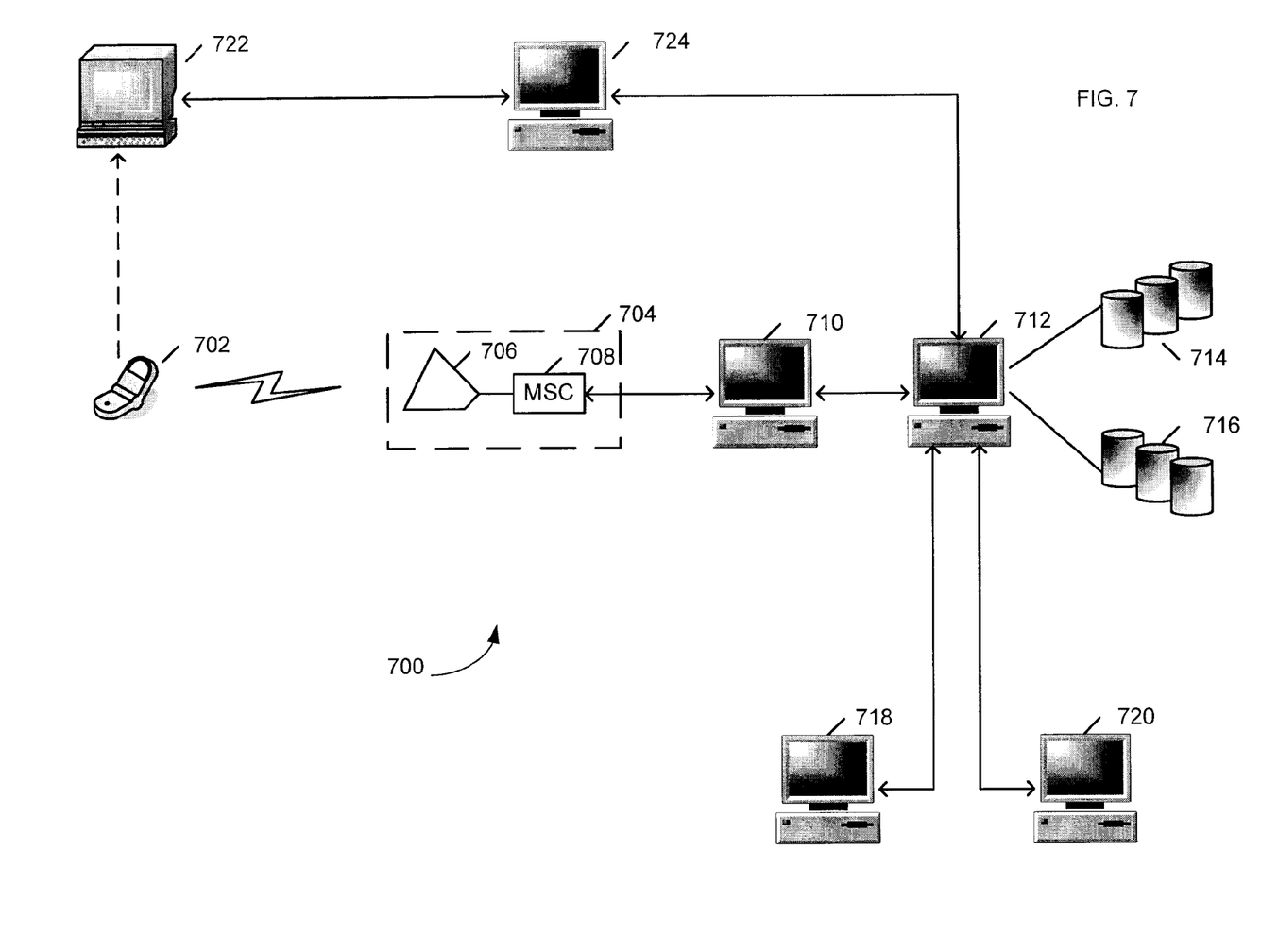
FIG. 7 is a diagram illustrating an example payment authentication system in accordance with one embodiment.

FIG. 6 is a diagram illustrating an example transaction completion process from the point of view of the payment authority. Accordingly, in step 602, the payment authority can receive the transaction code, merchant ID, and dollar amount from the transaction authority. In step 604, the payment authority can recognize the code and generate an approval code, which is returned to the transaction authority.

In step 606, the payment authority can store the approval code, merchant ID, and dollar amount and generate settlement instructions in step 608. In step 610, the payment authority can execute the settlement instructions. The settlement instruction can instruct that the appropriate funds be sent to the respective merchant's bank accounts.

In certain embodiments, the code can be of variable length. For example, a 4 digit code may not be sufficient at certain times or periods, to ensure that a unique code is available for every transaction occurring simultaneously. For example, the lunch or dinner hour may produce too many simultaneous transactions for a 4 digit code. Similarly, the Christmas season, for example, may result in an extended period of high transaction volume requiring more, or longer transaction codes. In certain embodiments, the length of the transaction code can be extended to 5, 6, etc., digits in order to accommodate such high volume.

It should also be noted that the idea of a simultaneous transaction depends to some degree on how long the transaction code remains valid. It should be apparent that the transaction code must remain valid for some period of time to allow completion of the transaction; however, for security reasons, the transaction code should not remain active indefinitely. Accordingly, the transaction can have an associated period of validity, e.g., 15 minutes, after which it is no longer valid. Modulating this period of validity can also help reduce the number of simultaneous transaction during busy periods and allow the use of a shorter code; however, this may not be preferable as the user may not be aware of the shorter period and inadvertently allow their code to lapse.

In certain embodiments, the transaction code can actually comprise certain digits generated by the payment authority and certain digits known to the user. This can allow an additional factor for authentication. For example, the payment authority can generate (step 412) a 4 digit code comprising two numbers and two blanks. When the user receives the code (step 304), they can fill in the blanks with two numbers known to the user and the payment authority. When the payment authority subsequently receives the transaction code from the transaction authority (step 602), the payment authority will recognize the complete code as a valid code and approve the transaction.

FIG. 7 is a diagram illustrating an example secure payment transaction system 700 configured in accordance with one embodiment. At the heart of system 700 is payment authority 712. As described above, payment authority 712 can be configured to establish and maintain user accounts. Thus for example, a user can log-on to payment authority 712 using their personal computer 718 and establish a user account, e.g., in accordance with the processes described in relation to the process illustrated in FIG. 1. Payment authority 712 can be configured to establish and store user account 714 in accordance with the process described in relation to FIG. 2.

Once a user's account is established, the user will have a PIN that they can input into their mobile communication device 702 and send to payment authority 712 in order to receive a transaction code that they can use to complete a payment transaction. When the user inputs the PIN into device 702, device 702 can transmit the PIN to payment authority 712 via message authority 710.

Device 702 can send the PIN via a variety of messaging services. For example, in one embodiment, device 702 can send the PIN via a text message such as an SMS message. Further, in certain embodiments a short code can be associated with payment authority 712. These short codes are typically 5 digits. Thus, the user can simply send an SMS message including the PIN to the short code. In such instances, messaging authority 710 will be a SMSC.

Thus, device 702 can generate a message that is sent to the associated communication network 704. It will be understood that communication network 704 will generally comprise a plurality of base station 706 interface with one or more Mobile Switching Centers (MSC) 708. The message can be received by base station 706 and forwarded to MSC 708, which can be configured to forward the message to message authority 710. e.g., the associated SMSC. In other embodiments, device 702 can be configured to send the PIN via an MMS message, in which case message authority will be an MMSC. In still other embodiments, device 702 can be configured to send a PIN via a SkyMail message, a short mail message, via e-mail messaging, e.g., using standard protocol such as SMTP over TCP/IP, etc.

Once payment authority 712 has validated the user using the PIN sent via device 702 and the mobile identifier included in the message, payment authority 712 can generate a transaction code and send it back to device 702 via communication networks 704. As noted above, in certain embodiments, further factors can be used to authenticate the user. For example, the network address associated with message authority 710 can be used to authenticate that the message came from the appropriate message authority. Further, message authority 710 can be configured to provide a digital certificate with the message that can be used by payment authority 712 to authenticate the validity of the message. In still other embodiments, payment authority can send a transaction code that included blank fields to be completed by the user as a further authentication factor.

Once the user receives the transaction code, the user can provide the transaction code to the merchant who will input the transaction code into the merchant's POS system 722. POS system 722 will then send the transaction code to payment authority 712 via transaction authority 724. Transaction authority 724 can, for example, be a gift cart or shared value processing system such as the ValueTech system, TenderCard system, Discover system, FDC gift processing system, Chockstone system, the BankServe system, etc.

Transaction authority 724 will recognize the transaction code as being associated with payment authority 712 and forward the transaction code, along with the merchant ID and transaction amount to payment authority 712. Payment authority 712 should recognize the transaction code and generate an approval code, which is sent back to POS system 722 via transaction authority 724. Once the approval code is received and processed in 722, the transaction can be completed and a receipt to be generated for the user.

Payment authority 712 can be configured to store the approval code, merchant ID, and transaction amount and generate settlement instruction 716, which can be forwarded to financial institution 720 for settlement.

It will be understood that communications network 704 can be a cellular communication network such as a GSM network, CDMA network, a 3G network, etc. Further, it will be understood that the various other components of system 700 can communicate using the associates network or networks, including the Internet and World Wide Web. For example, the other components can communicate via one or more wired or wireless Metropolitan Area networks (MANs), one or more wired or wireless Wide Area Networks (WANs), one or more wired or wireless Local Area Networks (LANs), one or more Personal Area Networks (PANs), etc. Further, it will be understood that the various components are configured to communicate using the requisite communication protocols and signal schemes.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A secure wireless payment transaction system, comprising:

at least one processor; and a memory connected with the at least one processor, the memory containing a plurality of program instructions that cause the at least one processor to:

receive a Personal identification Number (PIN) in a message that is sent from a mobile communication device;

receive a mobile communication device identifier identifying the mobile communication device with the message;

authenticate a transaction based on the PIN and the mobile communication device identifier;

generate a transaction code if the transaction is authenticated;

return the transaction code to the mobile communication device;

receive a transaction amount, a merchant identifier, and the transaction code from a merchant's Point of Sale (POS) system;

approve the transaction based on the merchant identifier, the transaction amount, and recognition of the transaction code, wherein, in causing the at least one processor to approve the transaction, the plurality of program instructions cause the at least one processor to determine whether a user account associated with the transaction contains sufficient funds to cover the transaction amount; and transmit an approval code to the POS system when the transaction is approved.

2. The secure wireless payment transaction system of claim 1, wherein the mobile communication device identifier is a Mobile Identification Number (MIN) associated with the mobile communication device.

3. The secure wireless payment transaction system of claim 1, wherein the transaction code is a 4 digit code.

4. The secure wireless payment transaction system of claim 1, wherein the transaction code is a 8 digit code.

5. The secure wireless payment transaction system of claim 1, wherein the transaction code includes blanks that are to be filled in using digits known to a user and to the secure wireless payment transaction system.

6. The secure wireless payment transaction system of claim 1, wherein the length of the transaction code is variable.

7. The secure wireless payment transaction system of claim 1, wherein the plurality of program instructions cause the at least one processor to relay the message from a message authority to a payment authority.

8. The secure wireless payment transaction system of claim 7, wherein the message authority provides a digital certificate to the payment authority, and wherein the payment authority uses the digital certificate to authenticate the transaction.

9. The secure wireless payment transaction system of claim 7, wherein the payment authority uses a network identifier associated with the message authority to authenticate the transaction.

10. The secure wireless payment transaction system of claim 1, wherein the plurality of program instructions cause the at least one processor to store the approval code, merchant ID, and transaction amount and to generate settlement instructions for the transaction.

11. The secure wireless payment transaction system of claim 10, wherein the plurality of program instructions cause the at least one processor to execute the settlement instructions.

12. The secure wireless payment transaction system of claim 1, wherein the message is a text message.

13. The secure wireless payment transaction system of claim 1, wherein the message is a Short Message Service (SMS) message.

14. The secure wireless payment transaction system of claim 13, wherein the SMS message is sent to the secure wireless payment transaction system via a short code.

15. The secure wireless payment transaction system of claim 1, wherein the plurality of program instructions cause the at least one processor to return a real time account balance with the transaction code.

16. The secure wireless payment transaction system of claim 1, wherein the transaction code remains valid for a predetermined period of time, after which the transaction code is no longer valid.

17. A method for secure wireless transaction, comprising:
   receiving a Personal identification Number (PIN) in a message that is sent from a mobile communication device;
   receiving a mobile communication device identifier identifying the mobile communication device with the message;
   authenticating a transaction based on the PIN and the mobile communication device identifier;
   generating a transaction code if the transaction is authenticated; and
   returning the transaction code to the mobile communication device;
   receiving a transaction amount, a merchant identifier, and the transaction code from a merchant's Point of Sale (POS) system;
   approving the transaction based on the merchant identifier, the transaction amount, and recognition of the transaction code, the approving including determining whether a user account associated with the transaction contains sufficient funds to cover the transaction amount; and transmitting an approval code to the POS system when the transaction is approved.

18. The method of claim 17, wherein receiving a mobile communication device identifier comprises receiving a Mobile Identification Number (MIN) associated with the mobile communication device.

19. The method of claim 17, wherein generating a transaction code comprises generating a 4 digit code.

20. The method of claim 17, wherein generating a transaction code comprises generating a 8 digit code.

21. The method of claim 17, wherein generating a transaction code comprises generating a transaction code that includes blanks that are to be filled in using digits known to a user and to a secure wireless payment transaction system.

22. The method of claim 17, wherein the length of the transaction code is variable.

23. The method of claim 17, further comprising receiving a digital certificate, and wherein authenticating the transaction further comprises authenticating the transaction based on the digital certificate.

24. The method of claim 17, wherein the transaction is authenticated using a network identifier associated with a message authority that relays the message.

25. The method of claim 17, further comprising storing the approval code, merchant ID, and transaction amount and generating settlement instructions for the transaction.

26. The method of claim 25, further comprising executing the settlement instructions.

27. The method of claim 17, further comprising returning a real time account balance with the transaction code.

28. The method of claim 17, wherein the transaction code remains valid for a predetermined period of time, after which the transaction code is no longer valid.

\* \* \* \* \*